United States Patent [19]

Godeau

[11] Patent Number: 5,228,724
[45] Date of Patent: Jul. 20, 1993

[54] DEVICE FOR THE RAPID ASSEMBLY OF A HOSE CONNECTION WITH AN AUTOMOTIVE VEHICLE HEAT EXCHANGER

[75] Inventor: Denis Godeau, Vieilles Maisons sur Joudry, France

[73] Assignee: Hutchinson, Paris, France

[21] Appl. No.: 736,105

[22] Filed: Jul. 26, 1991

[30] Foreign Application Priority Data

Jul. 31, 1990 [FR] France .................... 9009736

[51] Int. Cl.$^5$ ............... F16L 35/00; F16L 39/02
[52] U.S. Cl. ............................. 285/93; 285/332; 285/319; 285/921
[58] Field of Search .............. 285/3, 4, 24, 27, 93, 285/307, 332, 319

[56] References Cited

U.S. PATENT DOCUMENTS

| | | | |
|---|---|---|---|
| 1,904,061 | 4/1933 | Larson | 285/319 X |
| 3,773,360 | 11/1973 | Timbers | 285/307 |
| 3,923,323 | 12/1975 | Brogan | 285/3 |
| 3,997,196 | 12/1976 | Karcher et al. | 285/319 X |
| 4,022,497 | 5/1977 | Kotsakis | 285/4 |
| 4,280,523 | 7/1981 | Norton | 285/3 X |
| 4,589,684 | 5/1986 | Nowacki et al. | |
| 4,635,728 | 1/1987 | Harrington | 285/24 X |
| 4,887,665 | 12/1989 | Briet | 285/137.1 X |
| 4,944,536 | 7/1990 | Bartholomew | 285/319 |
| 5,029,904 | 7/1991 | Hunt | 285/24 |
| 5,062,478 | 11/1991 | Potier et al. | 285/319 X |
| 5,078,429 | 1/1992 | Braut et al. | 285/4 |
| 5,095,787 | 3/1992 | Leroux et al. | 82/118 |

FOREIGN PATENT DOCUMENTS

| | | |
|---|---|---|
| 2452708 | 7/1975 | Fed. Rep. of Germany .......... 285/4 |
| 3702246 | 3/1988 | Fed. Rep. of Germany . |
| 2660405 | 4/1991 | France . |
| 66391 | 3/1990 | Japan ................................... 285/93 |
| 2217417 | 10/1989 | United Kingdom . |

Primary Examiner—Dave W. Arola
Assistant Examiner—Heather Chun
Attorney, Agent, or Firm—Bell, Seltzer, Park & Gibson

[57] ABSTRACT

This invention is concerned with an assembly device of a hose connection in which a tubular joint is connected to the hose connection and is capable of cooperating with an inlet and outlet nipple of the waterbox of the heat exchanger, the tightness being ensured by a seal of an elastomer material and the maintenance in the assembled condition of the joint and the nipple being ensured by a bracket (14 and 15), the component carrying the bracket being fitted with a ring (12) with a conical outer surface, axially mobile in the unassembled condition.

7 Claims, 3 Drawing Sheets

DEVICE FOR THE RAPID ASSEMBLY OF A HOSE CONNECTION WITH AN AUTOMOTIVE VEHICLE HEAT EXCHANGER

FIELD OF THE INVENTION

The invention is concerned with a device for the rapid assembly by latching of a hose connection and an automotive vehicle heat exchanger.

BACKGROUND OF THE INVENTION

Patent application No.FR-88 01188 describes a device for assembling a tubular joint with a waterbox of an automotive vehicle heat exchanger with the aid of an easily-dismountable elastic linkage. The waterbox and the tubular joint are kept assembled by at least one bracket carried by the tubular joint, oriented axially and provided with a latching tooth at its axially internal end. This latching tooth, which thrusts against the axially external end of a tubular guide lug—into which the bracket is inserted—displays the form of a hook to prevent disassembly under the effect of pressure surges inherent in the operation of the cooling system associated with the vehicle engine, and, to enable the tooth to latch on to the axially external end of the tubular guide and stop lug, a large axial clearance is necessary.

In the assembly device described in patent application No.FR-88 01188, the waterbox of a heat exchanger and the tubular joint are kept assembled with the aid of two radially elastic brackets, carried by a ring housed inside the waterbox in a semi-circular groove of the waterbox, and thrusting against a box opposite this groove, the rings latching in slots made on the end of the tubular joint which is slotted over a peripheral portion lying between the slots. In this embodiment, the most delicate part of the assembly is placed inside the waterbox and there is no visual way to check that the assembly is correctly made.

In patent application No.FR 89 06976, which is also concerned with an assembly device for a heat exchanger and a tubular joint of the foregoing general type, the bracket carried by the tubular joint and axially oriented has the configuration of a leaf-spring, approximately U-shaped, of which one bracket projects from the joint in the direction of the assembly. Like the previous one, this design, which is simpler, also does not include means serving to check that the assembly is correctly made, nor to detect any accidental disassembly.

Patent application No.FR 90 04017 describes an assembly device for a heat exchanger and a tubular joint in which a locking ring is fitted with radial pins which latch into the corresponding housings provided in two nipples which nest together and which are connected to the tubular joint and the heat exchanger respectively. The ring has an extensible portion between each consecutive pair of pins, equipped with means indicating the deformed state of the ring and designed to display a correct locking of the assembly. However, like the others, this assembly has no means of guidance facilitating the placement of the tubular joint or on in the waterbox of the heat exchanger.

SUMMARY OF THE INVENTION

The present invention is therefore aimed to provide a device for the rapid assembly of a hose connection and a heat exchanger, which overcomes the respective drawbacks of the above-mentioned assemblies, while retaining their advantages, namely easy assembly and disassembly, only requiring a slight assembly force, simple and low-cost construction, the presence of means of visual inspection and means of guidance, an axial clearance necessary for assembly that is as small as possible, while eliminating any risk of accidental separation of the pieces joined together, the device also serving to protect the seal during the assembly operation, while making it easily interchangeable and loss-proof.

A device according to the present invention, for the assembly of a hose connection with a heat exchanger, particularly of an automotive vehicle, in which a tubular joint is connected to the hose connection on the one hand, and is capable of cooperating, on the other, with an inlet and outlet nipple of the waterbox of the heat exchanger by an easily dismountable elastic linkage, the tightness between the tubular joint and the nipple of the waterbox being ensured by a seal of an elastomer type of material, and the maintenance is assembled condition of the joint and the nipple being ensured by at least one bracket provided with a latching tooth oriented axially and carried either by the joint, or by the nipple, is characterized in that the component carrying the said bracket is fitted with a ring with a conical external surface, axially mobile in the unassembled condition, and in that the other component is matching so as to fit on the said ring by pushing it during assembly so as to mask it when the two components are assembled.

According to another characteristic of the invention, the nipple has at least one part with a conical internal profile, with the same taper as that of the ring.

In a preferred embodiment of the device according to the invention, the ring which is kept pushed towards the free end of the joint in the absence of load has a short cylindrical part, and the joint has an internal groove designed to receive the said cylindrical part of the ring, whereas the nipple and the joint at matching so as to completely mask the conical part and the cylindrical part of the ring respectively, when the joint is latched into the nipple.

In another preferred embodiment of the device according to the invention, the ring or at least its outer surface, is advantageously of a contrasting colour to the nipple to distinguish it from the latter, and is provided with at least one elastic tab that serves as further proof of latching, the joint being provided with at least one through slot positioned so that the tab is positioned opposite this slot and moves outside it when the joint is latched into the nipple, the tab remaining compressed and masked as long as a latching is not properly achieved.

According to another characteristic of the invention, the seal of the device is mounted on the component that carries the ring so that, in the unassembled condition, the latter masks it and protects it completely on the one hand, and, on the other, so that the seal remains on the said component in the case of disassembly because it is consequently loss-proof.

BRIEF DESCRIPTION OF THE DRAWINGS

The invention can be clearly understood from the description that follows, which refers to the appended drawing in which.

DETAILED DESCRIPTION OF THE PREFERRED EMBODIMENT

Figure 1:
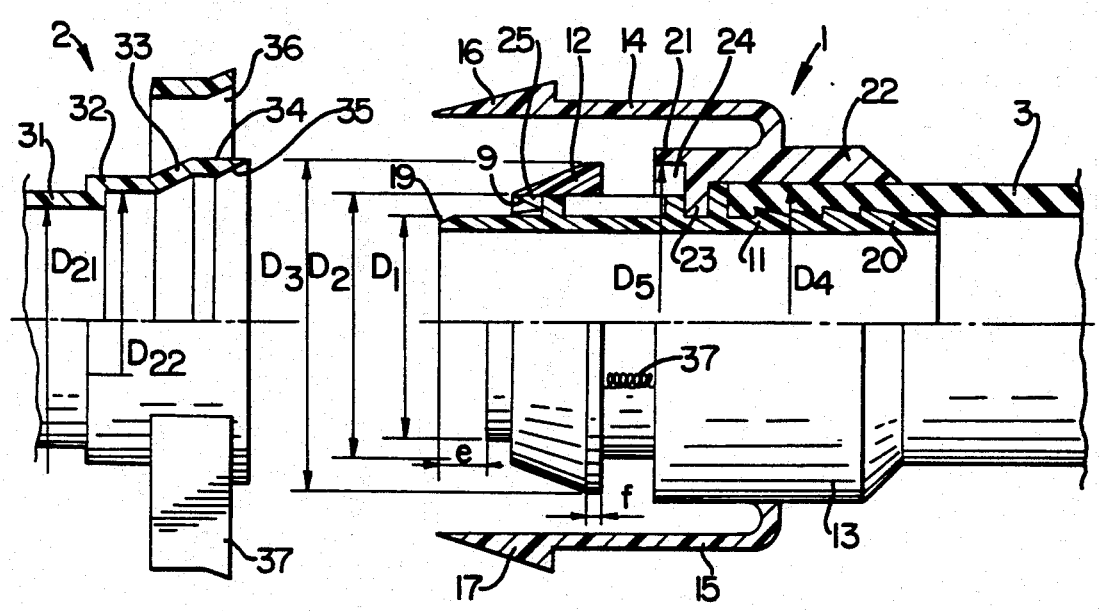
FIG. 1 is a side elevation and partially an axial sectional view of the device according to the invention before assembly.
Figure 2:
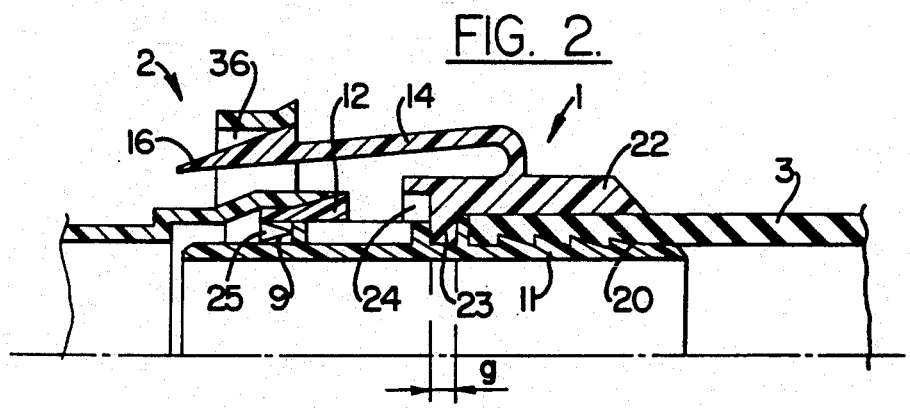
FIG. 2 is a partial axial sectional view of the same device during assembly.
Figure 3:
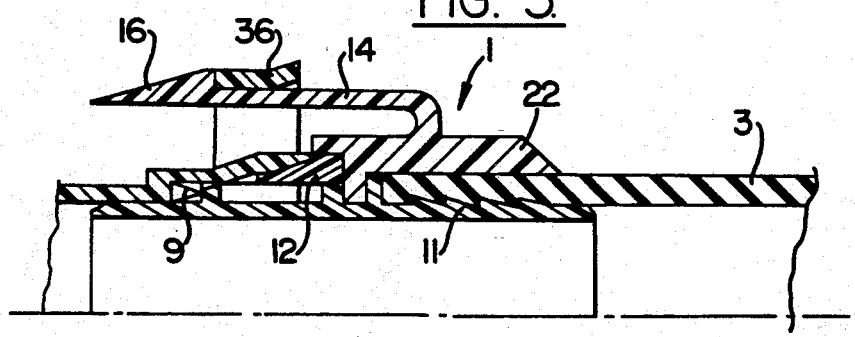
FIG. 3 is a partial axial sectional view of the completely assembled device.
Figure 4:
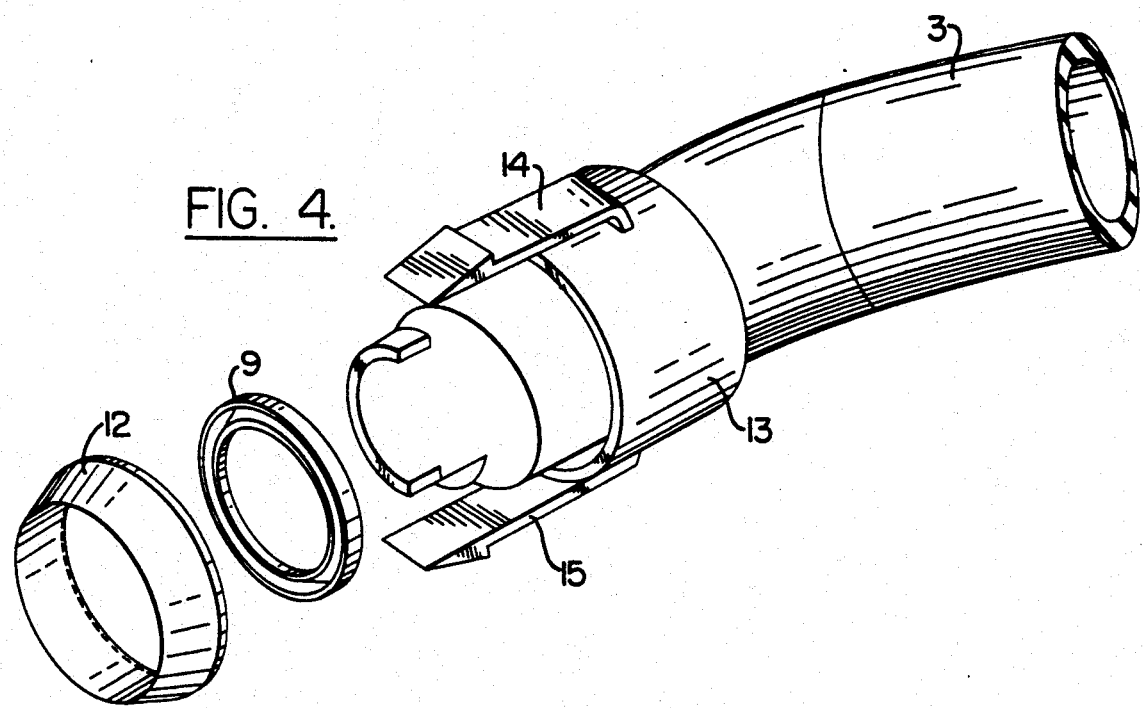
FIG. 4 is an exploded view of the different components of the device according to the invention.

The assembly device illustrated in FIG. 1 is of the type of those described in patent application No.FR 88 01188. It comprises a joint 1 capable of providing the connection of a hose connection 3 with a nipple 2 of a waterbox (not shown) of the heat exchanger, particularly for automotive vehicle. The joint 1 and the nipple of the waterbox are preferably made of plastic and, in the embodiment described and shown, the joint 1 consists of a first sleeve 11, a sliding ring 12, a second clip-holder sleeve 13 with two radially elastic brackets 14 and 15 fitted with latching teeth 16, 17, and a seal 9 kept in place on the sleeve by the ring 12 as long as the joint is not assembled with the nipple 2 of the waterbox. The sleeve 11 has an internal cylindrical shape over its entire length, except for its free end 19 designed to be nested in the nipple 2 of the waterbox, and which is semi-circularly scalloped over a length e, as shown in FIGS. 1 and 4, whereas its other end 20, to which is fixed the hose connection 3 is fitted over a portion of its length with hooking notches of the said hose connection.

The outer surface of the end part of the sleeve 11 designed to cooperate with the nipple of the waterbox is cylindrical, except for its free end corresponding to the above-mentioned scallop of length e. Between its front and back ends, the sleeve 11 has a central part of which the outer surface is also cylindrical in its major part, with outside diameter D2 greater than the outside diameter D1 of its front end and of the non-notched portion of its back end, except for the housing of a spring (37) pressing the ring 12 towards its position shown in FIG. 1.

The ring 12 has a cylindrical internal surface with a diameter of D2 and the necessary clearance to fit over the central portion of the sleeve 11, and an outer surface in the general form of a truncated cone terminating, on the side of the largest diameter, D3, in a cylindrical part of the same diameter D3 and of short length f.

The clip-holder sleeve 13 which can be made by a moulding of a single piece with the sleeve 11, has a generally cylindrical external shape. Its internal surface has two cylindrical parts 21, 22, of different inside diameters, respectively D4 and D5, separated by a cylindrical rib 23 of a very short length g and of inside diameter approximately equal to the outside diameter D1 of the sleeve, to make two annular shoulders between the parts 21 and 22.

The end of the pipe to which the joint is connected is inserted into the annular volume defined by the part 22, of diameter D4 slightly greater than D1, and the back end of the sleeve 11.

The part 21 has an inside diameter approximately equal to D3 with the necessary clearance for reception of ring 12, and a length equal to or slightly greater than the length f of the cylindrical part of the ring 12.

Whether the sleeve 13 is moulded in one piece with the sleeve 11 or whether it is built upon the latter, it is in any case positioned with respect to the sleeve 11 in such a way that the internal surface of its part 21 defines, with the outer surface of the central part of the sleeve 11, a groove 24 in which the cylindrical part of the ring 12 can be completely embedded. To do so, the rib 23 of the sleeve 13 thrusts against the annular shoulder resulting from the difference in outside diameters of the back and central parts of the sleeve 11.

Figure 5:
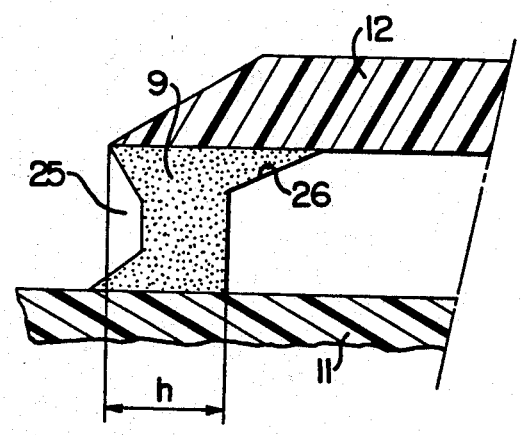
FIG. 5 is a larger-scale view of a part of FIG. 1.

In its pre-assembled position, the ring 12 creates, between its internal surface and the external surface of the free end 19 of the sleeve 11, an annular groove 25 in which is mounted, the seal 9 being of such a shape that it remains integral with the sleeve after any disassembly, being consequently loss-proof. As shown in FIG. 5, the shoulder which forms that groove root is bevelled at 26, thus favouring the sliding of the ring 12 and of the nipple 2.

The longitudinal cross-section of the nipple is variable in order to create a thrust surface of the ring 12, and surfaces cooperating with a cylindrical end of the joint 1 and with the seal 9 to guarantee tightness. Thus the nipple 2 comprises in succession: a cylindrical tubular part 31 with inside diameter D21 equal, within the necessary clearance, to the outside diameter D1 of the front part of the sleeve 11, a cylindrical part 32 of inside diameter D22 equal to D12, and equal or slightly greater in length than the maximum length of the seal 9, that is to say than the length h (FIG. 5), a first conical part 33 flared towards to free end of the nipple, of which the smallest inside diameter is equal to D22, and of which the slope is approximately equal to that of the ring 12, a short cylindrical intermediate part 34 of inside diameter equal to the largest diameter of the first conical part and a second conical part 35 of which the axial length, the slope and the diameters correspond to those of the conical part of the ring 12 so that when the joint 1 is positioned in the nipple 2, the conical outer surface of the ring 12 bears tangentially against the inner surface of the second conical part 35 of the nipple, which pushes the ring 12 as the joint is embedded into the nipple until the cylindrical part of the ring is completely masked, being embedded in the groove 24, the conical part of the ring being then also completely masked by the nipple. In this relative position of the nipple and the joint, the brackets 14 and 15 which, during assembly, have slid into the lugs 36, 37 on the outer surface of the nipple, by guiding the movement of the joint, are latched, the frontal surfaces of the teeth 16, 17 thrusting against the frontal surfaces of the legs opposite the free end of the nipple, which are slightly convex to correspond with the hollowing of the frontal surfaces of the teeth.

The cylindrical part 34, created between the two conical parts 33 and 35 of the nipple 2 of the waterbox, prevents damage to the edges of the ring and the seal.

Figure 6:
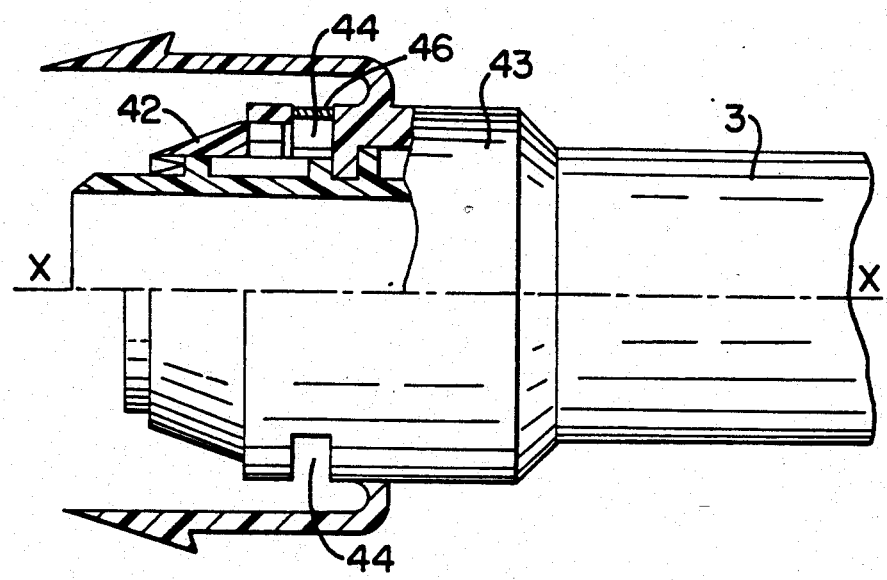
FIGS. 6 and 7 correspond to FIGS. 1 and 3, but for a variant of the device.
Figure 7:
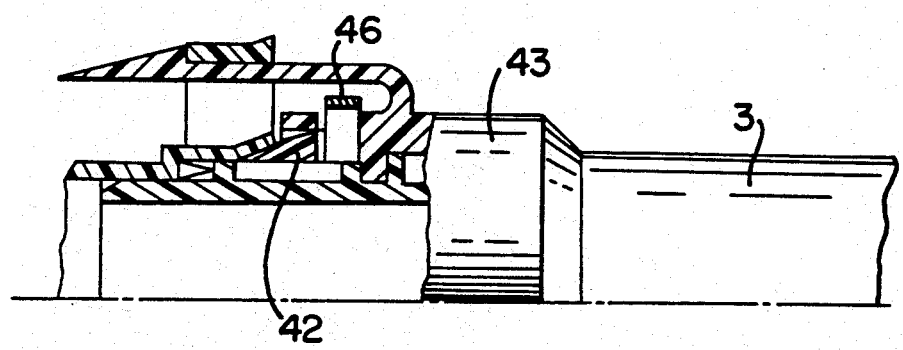

The assembly device illustrated in FIGS. 6 and 7 only differs from the one illustrated in the previous figures by the conformation of its mobile ring 42 and by the through slots 44 in the wall of the clip-holder 43. The ring 42 has a conical part similar to that of the ring 12 but no cylindrical part, and it is provided on its front face, perpendicular to an axis XX of the overall device, with two elastic tabs 46 (of which only one is shown in the figures), compressed and hence masked by the clip-holder 43 as long as the joint is not latched into the nipple, but which, by contrast, are deployed as they become visible when the joint is latched, the tabs then being positioned in the slots 44. In this variant of embodiment, the tabs 46 are the indications of latching and it is not essential for the nipple to be dimensioned so as to completely mask the ring in the assembled condition. Since the smallest diameter end of the conical part bearing on the ring does not come into contact with the edge of the ring, the cylindrical part of the sliding ring in FIGS. 1 to 5 is eliminated.

As shown from the above, the invention is in no way limited to those of its embodiments and applications described above or explicitly. On the contrary, it includes all variants that may come to the mind of the professional in the art, without deviating from the framework nor the scope of the present invention. In particular, the arrangement of the brackets 14 and the stop lugs 36, 37 may be reversed (i.e. the brackets may be carried out by the waterbox while the lugs may be provided on the joint), without necessarily affecting the result.

Moreover, it is clear that the brackets acting as a spring can be made in a single piece with the joint (or the waterbox) or may be formed of metal brackets built on or duplicated-moulded according to the teachings of application No.FR 88 01188 already mentioned above.

I claim:

1. Device for assembling a hose connection with a heat exchanger, particularly of an automotive vehicle, in which a tubular joint is connected to the hose connection on the one hand and, on the other hand, is capable of cooperating with an inlet or outlet nipple of the waterbox of the heat exchanger by an easily dismountable elastic linkage, the tightness between the tubular joint and the nipple of the waterbox being ensured by a seal of an elastomeric type of material and the maintenance in the assembled condition of the joint and the nipple being ensured by at least one lug means carried by one of said joint or nipple and at least one bracket provided with a latching tooth axially oriented and carried by the other of said joint or nipple for the engagement with said at least one lug means, characterized in that a first end of the component carrying the said bracket is fitted with a ring with a conical outer surface, axially mobile in the unassembled condition, and in that the other component is matching so as to fit on the said ring, by pushing said ring during the assembly so as to mask said ring when the two components are assembled.

2. Device according to claim 1, characterized in that the nipple (2) has at least one part (34) with a conical internal profile of the same taper as that of the ring (12) fitted to the joint (1).

3. Device according to claim 2, characterized in that the ring (12) comprises a short cylindrical part, and that the nipple (2) and the joint (1) are matching respectively, so as to completely mask the conical part and the cylindrical part respectively of the ring when the joint is latched into the nipple, and in that the joint has an internal groove designed to receive the said cylindrical part of the ring (12).

4. Device according to claim 1, characterized in that the ring (42) is provided with at least one elastic tab, which serves as a supplementary indication of latching, and in that the joint is provided with at least one through slot (44) positioned so that the tab is positioned in this slot and is deployed at the exterior when the joint is latched into the nipple, the tab remaining compressed and masked as long as matching has not been achieved.

5. Device according to claim 1, characterized in that the said seal (9) is mounted on the joint (1) which carries the ring (12) in such a way that, in the unassembled condition said ring masks and protects said seal.

6. Device according to claim 1, characterized in that the hose connection assembly device has a spring maintaining the ring (12) pushed towards a free end of the joint (1) in the absence of external load.

7. Device according to claim 1, characterized in that the ring (12,42) or at least its outer surface, is of a contrasting colour to the nipple.

* * * * *